United States Patent [19]

Foster

[11] Patent Number: 4,995,227

[45] Date of Patent: Feb. 26, 1991

[54] POWER ASSISTED REEL TYPE LAWN MOWER

[76] Inventor: Harry C. Foster, R.R. 1, Georgetown, Ontario, Canada, L7G 4S4

[21] Appl. No.: 426,207

[22] Filed: Oct. 25, 1989

[51] Int. Cl.⁵ .............................................. A01D 35/24
[52] U.S. Cl. ......................................... 56/249; 56/252
[58] Field of Search ............... 56/249, 252, 10.5, 10.8, 56/11.7, 11.8, 11.9

[56] References Cited

U.S. PATENT DOCUMENTS 3,581,480 6/1971 O'Connor, III .................. 56/249 X
3,732,673 5/1973 Winn, Jr. ............................. 56/249

Primary Examiner—Thuy M. Bui

[57] ABSTRACT

This invention relates to a reel-type lawn mower for cutting lawns which includes a cutting reel propelled by an electric motor connected to the cutting reel by transmission structure and propelled by drive wheels connected to the cutting reel by clutch structure for assisting the electric motor in propelling the cutting reel when greater cutting speeds of the cutting reel is required than delivered by the electric motor.

16 Claims, 2 Drawing Sheets

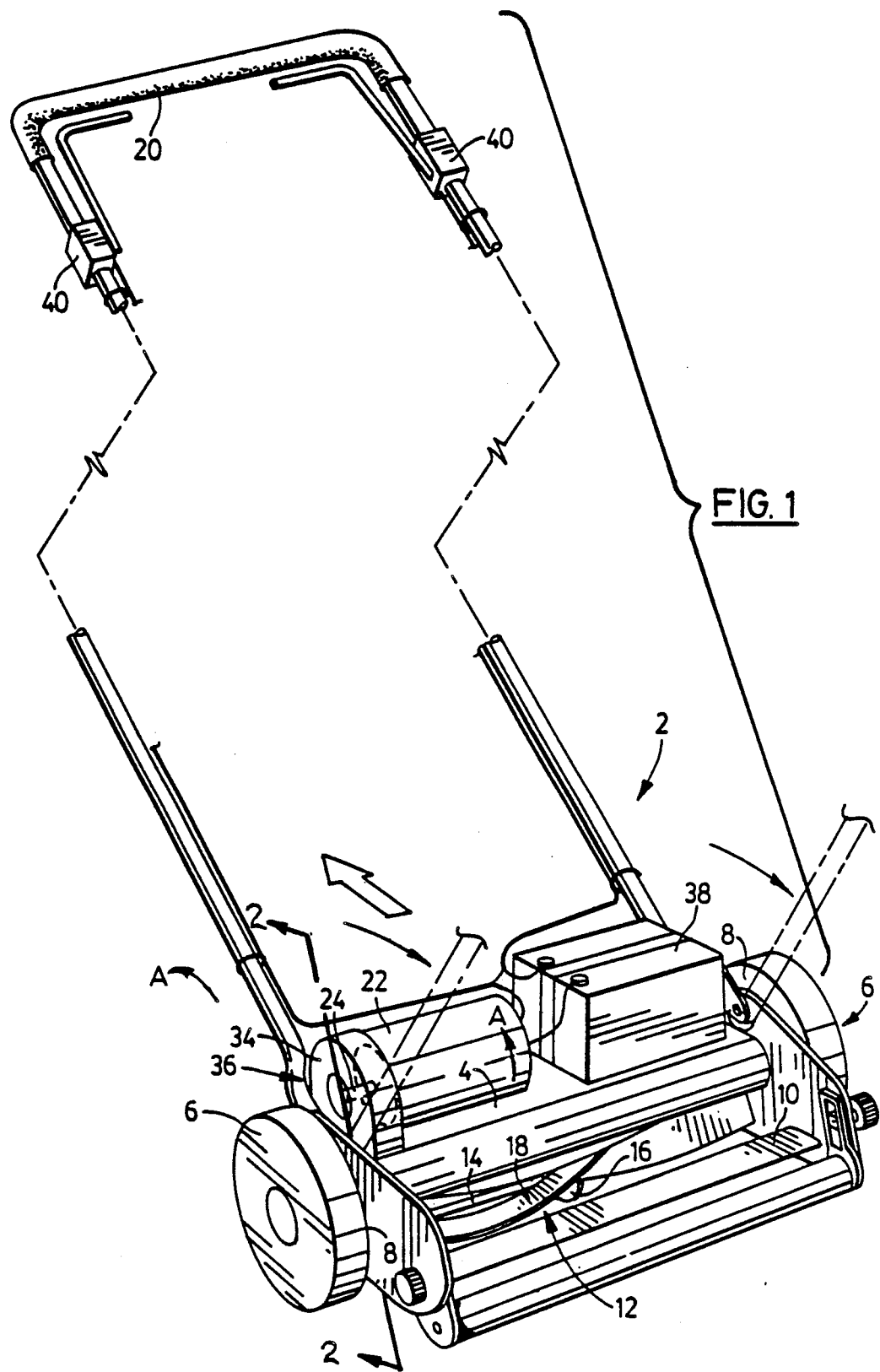

POWER ASSISTED REEL TYPE LAWN MOWER

FIELD OR INVENTION

This invention relates to reel-type lawn mowers and more particularly to reel-type lawn mowers having a rechargeable battery connected to an electrical motor for propelling the cutting reel with manual means for assisting the battery in propelling the reel cutter.

BACKGROUND TO THE INVENTION

Hand-driven lawn mowers ordinarily include a pair of spaced-apart wheels in contact with the ground for driving a cutting reel as the mower is pushed along.

Various hand-driven lawn mowers have heretofore been designed and constructed, some of which also include battery power for energizing the lawn mower.

For example, U.S. Pat. No. 3,581,480 discloses a reel-type lawn mower including battery means for energizing the electric motor for driving the reel cutter.

Moreover, U.S. Pat. No. 2,417,613 discloses an electric motor control and differential gear drive for lawn mowers embodying a frame having a means for mounting storage batteries thereon rearwardly of the knife reel and the lower end of the handle.

Furthermore, U.S. Reissue Pat No. 24,594 teaches the use of a battery-powered disc-type lawn mower.

Yet another arrangement is shown in U.S. Pat. No. 3,732,673 which teaches the use of uni-directional clutches of a ratchet pinion type which are reversed thereby making such unit a motor-propelled lawn mower.

Finally, U.S. Pat. No. 1,401,156 teaches the use of a motor and a pulley arrangement engageable with a reel shaft of a lawn mower.

These and other arrangements of the prior art present relatively complicated structure. Furthermore, such prior art devices do not allow power assistance from the manual user of the lawn mower so as to share the power requirements for cutting with the electric motor.

It is an object of this invention to provide a relatively simple lawn mower having an improved power sharing arrangement between the electric motor and the manual power imparted by the user of the lawn mower pushing the lawn mower along the ground.

The broadest aspect of this invention relates to a reel-type lawn mower for cutting lawns including a cutting reel propelled by an electric motor connected to the cutting reel by transmission structure and propelled by drive wheels connected to the cutting reel by clutch structure for assisting the electric motor in propelling the cutting reel when greater cutting speeds of the cutting reel is required than delivered by the electric motor.

It is another aspect of this invention to provide a reel-type lawn mower for cutting lawns including: a frame; a pair of drive wheels associated with the frame; a cutting reel mounted for rotational movement about a rotational axis between said drive wheels; rechargeable battery attached to said frame; an electric motor attached to said frame and electrically connected to said rechargeable battery; transmission structure connecting said electric motor and said cutting reel whereby said electric motor propels said cutting reel when energized by said rechargeable battery for cutting said lawn; and clutch structure associated and engageable with said drive wheels when said lawn mower is manually pushed forward for assisting said electric motor in propelling said cutting reel when greater cutting speed of said cutting reel is required than delivered by said electric motor, and wherein said clutch structure is disengageable with said drive wheels when said lawn mower is manually pushed backwards.

DRAWINGS

These and other objects and features of the invention shall now be described in relation to the following drawings.

FIG. 1 is a perspective view of the reel-type lawn mower of this invention.

DESCRIPTION OF INVENTION

Figure 3:
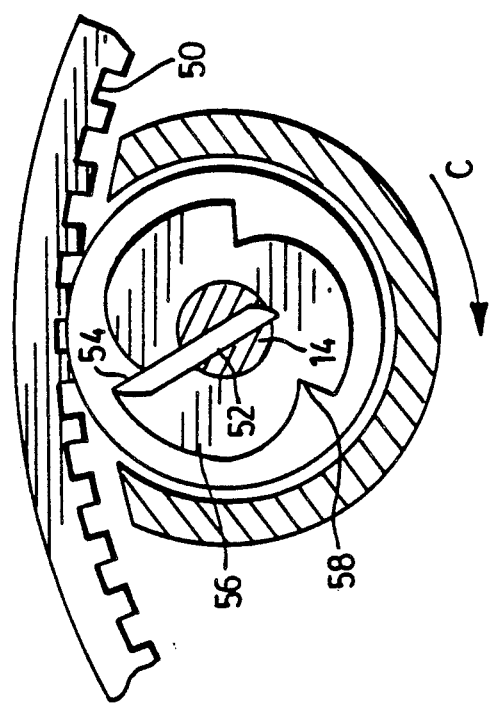
FIG. 3 is a partial cross-sectional view of the ratchet pinion clutch mechanism taken along the lines 3—3 of FIG. 2.

Like items have been given like numbers throughout the figures.

FIG. 1 shows the reel-type lawn mower 2 which includes a frame 4 with a pair of spaced apart drive wheels 6. The drive wheels 6 are journaled for rotational movement around a pair of spaced hubs 8. The hubs 8 are connected to the frame 4. The reel-type lawn mower 2 also includes a knife bar 10 which co-operates with the cutting reel 12 in a manner well known to those persons skilled in the art so as to cut the grass of a lawn. The cutting reel 12 consists of cutting bar or shaft 14, spiders 16 which are adapted to retain cutting blades 18 in a manner well known to those persons skilled in the art.

Furthermore, the cutting reel 12 is adapted for rotational movement about the rotational axis of bar or shaft 16 between drive wheels 6.

The reel-type lawn mower also includes handle structure 20 which may be grasped by the user of the lawn mower 2 so as to push the reel-type lawn mower 2 along the ground so as to manually rotate the drive wheels 6 and push the lawn mower 2 forward in a manner which shall be more fully described herein.

Figure 2:
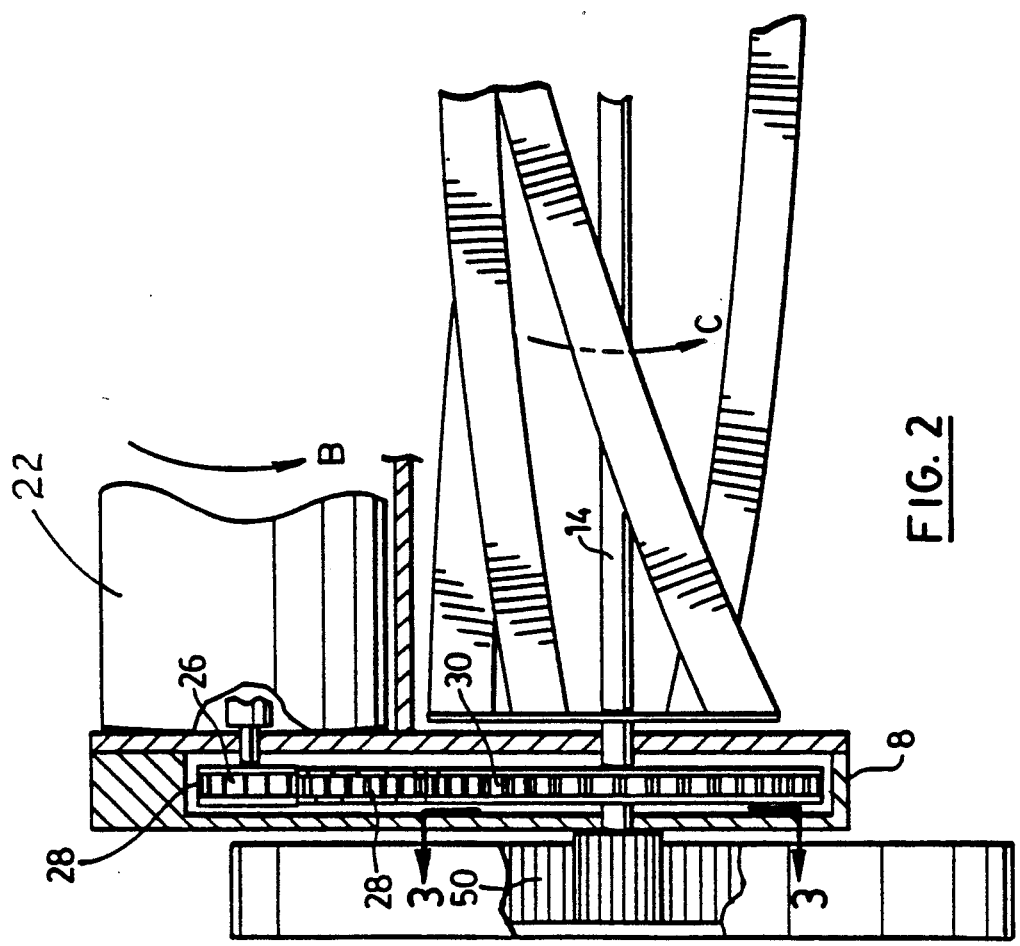
FIG. 2 is a cross-sectional view of the transmission structure of the reel-type lawn mower taken along the lines 2—2 of FIG. 1.

The lawn mower 2 also includes electric motor 22 which is attached to frame 4. The electric motor 22 includes drive shaft 24 which as illustrated in FIG. 1 is disposed parallel to the rotational axis of cutter bar 14. The end of drive shaft 24 remote from motor 22 includes a first sprocket 26 which is adapted to engage an endless chain 28 as best illustrated in FIG. 2. One end of cutting reel 12 includes a second sprocket 30 which is connected to cutter bar 14 and is adapted for engagement with the endless chain 28. The frame 4 has an appropriate opening so as to accommodate the first and second sprockets 26 and 30 and endless chain 28. Furthermore, a casing 34 is provided so as to encase the first and second sprockets 26 and 30 respectively and endless chain 28. Such casing 34 prevents debris and grass cuttings from clogging up sprockets 26 and 30 and endless chain 28.

The first sprocket 26, second sprocket 30 and endless chain 28 comprise the transmission means generally depicted as item 36 in FIG. 1. However, the transmission means may also comprise of first and second pulleys (not shown) and an endless belt. Furthermore, the transmission means 36 may comprise a gear box and worm wheel (not shown) rather than the transmission structure revealed in FIGS. 1, and 2. The motor 22 and drive shaft 24 would be disposed perpendicular to the rotational axis when a worm gear (not shown) is utilized.

The reel-type lawn mower 2 includes a rechargeable battery 38 which is electrically connected to electric motor 22 by suitable wiring (not shown).

Furthermore, reel-type lawn mower 2 includes switches 40 disposed on the handle 20 as shown which switches 40 are electrically connected to rechargeable battery 38 and motor 22 such that when switches are activated the rechargeable battery 38 energizes electric motor 22. Two switches 40 are utilized for safety reasons.

Upon energization of electric motor 22, drive shaft 24 is adapted to rotate in the direction of arrow A which causes first sprocket 26 to rotate in a direction of arrow B so as to motivate the endless chain 28 to rotate which thereby causes second sprocket 30 to rotate in the direction of arrow C and thereby propel the cutter reel 18 to rotate in the same direction as arrow C. Accordingly grass located between the blades 18 and knife 10 is cut therebetween. Arrows A, B and C rotate in a counter-clockwise direction when an observer stands facing wheel 6 which is closest to motor 22.

The rechargeable battery 38 as shown comprises of a 12-volt battery while the electric motor 22 comprises a 150 to 250-watt direct current motor.

The rechargeable battery 38 achieves approximately one hour of operation on a single charge.

The propelling power transmitted by the drive wheels 8 shall now be described in relation to FIGS. 2 and 3 of the enclosed figures.

The hub 8 includes ring gear 50 disposed interiorally of hub 8. Cutter bar 14 extends interiorally of hub 8 and is adapted for rotational movement therein. The end of cutter bar or shaft 14 includes a keyway or hole 52 which is adapted to receive pawl 54. Pinion gear 56 is disposed for rotational movement with the end of cutter bar 12 interiorally of hub 8 in a manner to be described herein. Pinion gear 56 is hollow or cupped out so as to include a hole at one end of receiving the end of reel shaft or rod 14 therein. The inner surface of pinion gear 56 is formed with ratchet teeth 58 protruding inwardly towards the centrally disposed reel shaft 14. A double-ended pawl member 54 is mounted to slide back and forth within the keyway or hole 52 extending transversely through the end of the reel shaft 14.

As best seen in FIG. 3 the reel rod 14 may rotate freely in the counter-clockwise direction (when viewing FIG. 3) because the pawl 54 will be cammed back and forth by inclined surfaces of the ratchet teeth 58. The pawl 54 will be pushed alternatively by the inclined surfaces on one side and then by the inclined surfaces on the other side of the ratchet teeth 58 as the reel rod 14 rotates counter-clockwise when viewing FIG. 3. (This direction will be counter-clockwise when an observer stands facing wheel 6 closest to motor 22).

However, when the reel shaft 14 rotates clockwise as seen in FIG. 3, one end of the pawl 54 will abut against the side of ratchet tooth 58 to engage the clutch and to drive the pinion gear 56.

The mechanism of pawl 14 and ratchet 58 comprise the clutch means of the invention as described herein. However other clutch means accomplishing the function described may be used without departing from the invention.

Accordingly, when the user of the reel-type lawn mower 2 pulls back the lawn mower 2, the clutch mechanism described herein disengages and the drive wheels 6 may be pulled backwardly without rotation of the cutting reel 12.

When the switch 40 of the reel-type lawn mower 2 is disengaged so as to disengage the electric motor from driving cutter reel 12, the lawn mower 2 may still be used in the conventional manner by the user pushing on handle 20 so as to rotate drive wheels 6 in the direction of arrow C so as to engage the clutch mechanism as described above so as to revolve ring gear 50 and thereby cutter shaft 14 so as to propel the cutting reel manually.

The power output of the rechargeable battery 38 and the specification of the electrical motor 22 is designed so that when the switch 40 is activated the transmission means 36 propels the cutting reels 18 at speed of approximately twice the speed that the cutting reels 18 may be rotated if the cutting reels 18 are manually propelled by the clutch structure as described. Accordingly, the electric motor 22 will provide the total propelling power of the cutting reels and the manual power of the user will be used only to guide the lawn mower by the operator who walks behind the reel-type lawn mower 2. More particularly, as the electric motor 22 provides sufficient power to rotate cutting reels 12, the pawl 54 will be disengaged from ratchet teeth 58.

However, should the cutting reel 12 slow down when, for example, extra thick grass or other obstacle is encountered or when the rechargeable battery 38 is exhausted or nearly exhausted the operator may apply manual power to push the lawn mower by pushing against handle 20 so as to assist the electric motor 22 to maintain the desired cutting speed of the cutting reel 12. In the extreme case when the rechargeable battery 38 is exhausted or when the electric switch 40 is not depressed the operator may provide all the cutting speed of the cutting reel 12 and the motive power to guide the lawn mower 2. In such case the lawn mower 2 is operated as a conventional manually-operated push mower.

When the rechargeable battery 38 is exhausted or the electrical switch is not depressed the electric motor 22 is still connected to the cutting reel 12 and revolves freely with minimal friction. Optionally a unidirectional clutch of the ratchet pinion type may also be included in connection with the electrical motor 22 to the cutting reel 12 so as to enable transmission of motor power from the motor 22 to the cutting reel 12 but not vice versa. This arrangement will circumvent the necessity to rotate the motor 22 when the lawn mower is operated manually and would be desirable when a worm-gear type gear box is used between the motor 22 and the cutting reel 12.

Accordingly, the invention described herein allows the manual power to assist the electrical power to rotate the cutting reel 12. In other words, there is a shared power between the power provided manually and that provided by the electrical motor 22. Furthermore, the degree of sharing the power between the manual operation and electrical power may be varied in accordance with the demands placed on the reel-type lawn mower 2 as in the case when thicker grass is encountered or as the battery power is being depleted.

Although the preferred embodiment as well as the operation and use have been specifically described in relation to the drawings, it should be understood that variations in the preferred embodiment could be achieved by a skilled man in the trade without departing from the spirit of the invention. Accordingly the invention should not be understood as to be limited to the exact form revealed by the drawings.

The embodiments of this invention in which an exclusive property or privilege is claimed are defined as follows:

1. In a reel-type lawn mower for cutting lawns, including cutting reel means propelled in a first direction by electric motor means connected to said cutting reel means by transmission means upon energizing said electric motor means for cutting said lawn, and; drive wheel means engageable with said cutting reel means by unidirectional clutch means for propelling said cutting reel means upon manually activating said drive wheel means and said uni-directional clutch means so as to assist said electric motor in propelling said cutting reel means when greater cutting speeds of said cutting reel means is required than delivered by said electric motor means and where said drive wheel means are disengageable with said cutting reel means through said unidirectional clutch means where said electric motor means provides sufficient cutting speed to propel said cutting reel.

2. In a reel-type lawn mower as claimed in claim 1 wherein said electric motor means is energized by rechargeable battery means.

3. In a reel-type lawn mower as claimed in claim 2 wherein said transmission means comprise sprocket means and endless chain means for transmitting rotary power from said electric motor means to said cutting reel means.

4. In a reel-type lawn mower as claimed in claim 1 wherein said transmission means comprise pulley means and endless belt means for transmitting rotary power from said electric motor means to said cutting reel means.

5. In a reel-type lawn mower as claimed in claim 1 wherein said transmission means comprise gear box means and worm gear means for transmitting rotary power from said electric motor means to said cutting reel means.

6. In a reel-type lawn mower as claimed in claims 3, 4 or 5 wherein said drive wheel means solely propel said cutting means when said rechargeable battery means is depleted.

7. In a reel-type lawn mower as claimed in claim 6 wherein said electric motor means is freely rotated by said cutting reel means through said transmission means when said rechargeable battery means is depleted.

8. In a reel-type lawn mower as claimed in claim 7 wherein said uni-directional clutch means comprise ratchet pinion clutch means.

9. In a reel-type lawn mower for cutting lawns including:
  (a) a frame;
  (b) a pair of drive wheels associated with said frame;
  (c) a cutting reel mounted for rotational movement about a rotational axis between said drive wheels;
  (d) rechargeable battery means attached to said frame;
  (e) a handle attached to said frame for manually pushing said reel type lawn mower;
  (f) electric motor means attached to said frame and electrically connected to said rechargeable battery means;
  (g) transmission means connecting said electric motor means and said cutting reel whereby said electric motor means propels said cutting reel in a forward direction when energized by said rechargeable battery means for cutting said lawn;
  (h) uni-directional clutch means associated and engageable with said drive wheels when said lawn mower is manually pushed forward so as to guide said lawn mower and to assist said electric motor in propelling said cutting reel in said forward direction when greater cutting speed of said cutting reel is required than delivered by said electric motor means, and wherein said uni-directional clutch means is disengageable with said drive wheels when said lawn mower is manually pulled backwards and where said uni-directional clutch means is disengageable with said drive wheels when said lawn mower is manually pushed forward and said electric motor provides sufficient cutting speed to propel said cutting reel.

10. In a reel-type lawn mower as claimed in claim 9 wherein said electric motor means includes a drive shaft 12.

11. In a reel-type lawn mower as claimed in claim 10 wherein said transmission means includes:
  (a) a first sprocket means attached to said drive shaft;
  (b) a second sprocket means attached to said cutting reel;
  (c) endless chain means connecting said first and second sprocket means
wherein said drive shaft of said electric motor means is disposed parallel to said rotational axis of said cutting reel.

12. In a reel-type lawn mower as claimed in claim 11 wherein said clutch means comprises ratchet pinion clutch means.

13. In a reel-type lawn mower as claimed in claim 10 wherein said transmission means includes:
  (a) first pulley means attached to said drive shaft;
  (b) second pulley means attached to said cutting reel;
  (c) endless belt means connecting said first and second pulley means
wherein said drive shaft of said electric motor means is disposed parallel to said rotational axis of said cutting reel.

14. In a reel-type lawn mower as claimed in claim 13 wherein said clutch means comprises ratchet pinion clutch means.

15. In a reel-type lawn mower as claimed in claim 10 wherein said transmission means comprises a gear box means including worm gear means and wherein said drive shaft of said electric motor means is disposed perpendicular to said rotational axis of said cutting reel.

16. In a reel-type lawn mower as claimed in claim 15 wherein said clutch means comprises ratchet pinion clutch means.

* * * * *